Sept. 22, 1959     C. H. NEWMAN     2,905,074
BEVERAGE DISPENSING DEVICE
Filed July 21, 1955
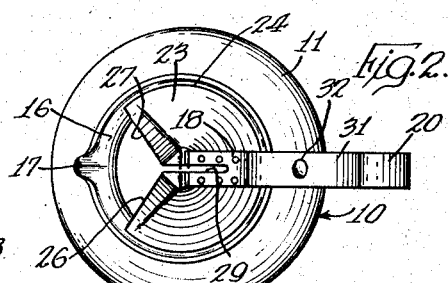
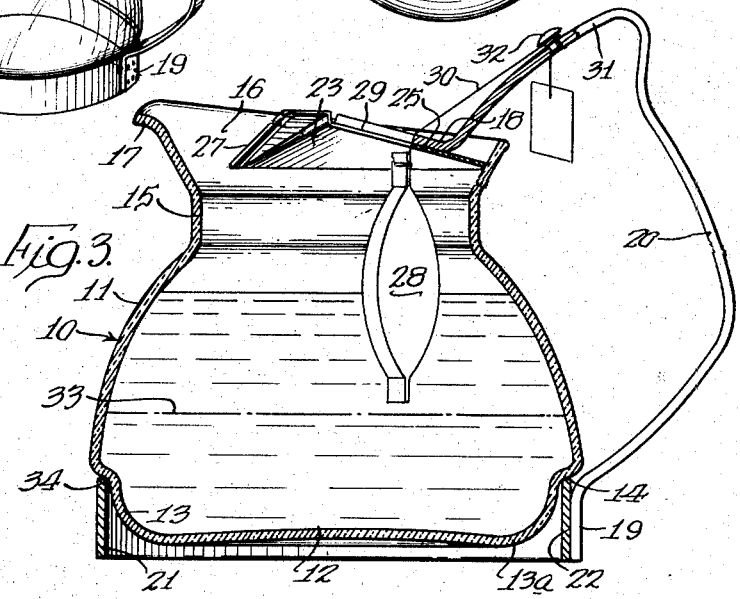
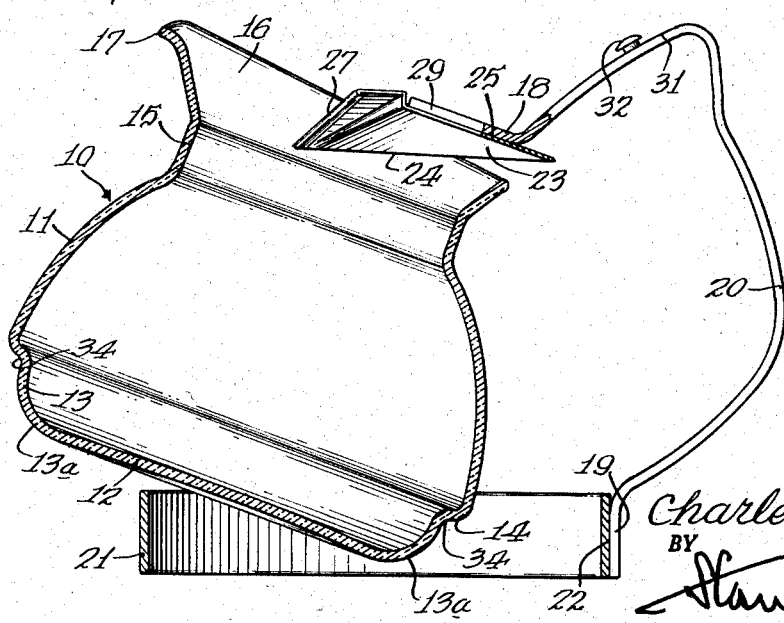
INVENTOR.
Charles H. Newman
BY
Atty.

2,905,074

BEVERAGE DISPENSING DEVICE

Charles H. Newman, Northfield, Ill., assignor to Ekco Products Company, Chicago, Ill., a corporation of Illinois Application July 21, 1955, Serial No. 523,559

2 Claims. (Cl. 99—295)

This invention relates generally to a vessel of the decanter or pitcher type combined with a simple, readily placeable and removable holder arrangement for convient handling of the vessel as well as to provide for disassembly from the vessel to facilitate cleansing thereof after each instance of use.

More particularly, however, this invention is concerned with a beverage dispenser which is especially useful in the preparation and serving of beverages by means of an infusion type package or bag containing a material adopted to be infused in a liquid, such as tea or coffee.

It is an object of this invention to provide a dispenser of the character indicated wherein the vessel provides space between the mouth thereof and the level of the liquid therein in which the infusion package or bag may be retained in raised relation to said liquid level.

A further object resides in the provision of means through which the flexible retrieving line attached to the infusion package may be conveniently fastened outside the vessel.

A still further object resides in the provision of a vessel of such transparency as to render the liquid contents visible therethrough for convenient observation as to quantity and concentration or strength of such contents.

With the foregoing and other objects in view, the invention will be more fully described hereinafter, and will be more particularly pointed out in the claims appended hereto.

Fig. 1 is perspective view of a beverage dispenser showing the present invention in its preferred form applied thereto.

Fig. 2 is top plan view of the dispenser shown in Fig. 1.

Fig. 3 is an enlarged vertical section, with parts in elevation, taken on line 2—2 of Fig. 1.

Fig. 4 is a similar view showing the holder arrangement and the vessel in a position of partial assembly.

Referring more particularly to the drawings, a vessel embodying the features of this invention is designated generally by the numeral 10 and is preferably constructed of transparent material such as heat resistant glass.

As shown in the drawings, the vessel 10 comprises a decanter-shaped hollow body having a bulging side wall portion 11 and a closed bottom portion 12 which has an annular marginal wall 13 defining an inwardly offset downward extension of the side wall portion 11 and an outwardly projecting annular flange 14 providing a downwardly facing seat or shoulder 14 joining said wall portions 12 and 13. The side wall portion 12 converges near the top to provide a cylindrical neck portion 15. The mouth of the vessel is defined by an upwardly and outwardly flared brim 16 forming an upward extension of the neck portion 15. The upper edge of the brim 16 slants downwardly and rearwardly from a pouring lip 17 forming a radial extension of the brim 16.

The holder is preferably composed of a longitudinally-arched elastic strip of metal which spans the height of the vessel and comprises an upper end portion 18, a lower end portion 19 and a handle portion 20 between said end portions. A circular band or collar 21, adapted to surround the marginal wall 13 of the bottom 12 of the vessel, is fixed as at 22 to the lower end portion 19 of the handle 20. A cover plate 23, presenting an arcuate edge portion 24 adapted to be rotatably received within the upwardly and outwardly flared brim 16 of the vessel is secured as at 25 to the upper end 18 of the handle 20. The material of the handle 20 is internally stressed so as to normally locate the cover plate 23 and the collar 21 in opposed relation at a fixed distance apart less than the distance separating said cover plate and ring when operatively combined with the vessel as shown in Fig. 3 whereby the handle 20 and the ends 18 and 19 thereof exert an inward endwise pressure against said cover plate and ring when the latter are in operative position on the vessel.

The lower surface of the bottom 12 of the vessel and the wall portion 13 merge to define a rounded junction 13a. Because of the flexible character of the handle 20, the cover plate and the collar secured to opposite ends thereof are necessarily yieldable with respect to each other, and accordingly the ring is readily adapted for sliding engagement with such rounded junction 13a during movement toward and away from an operative position encircling the wall portion 13 while the cover plate likewise has sliding engagement with the inwardly facing surfaces of the brim 16. Thus the handle assembly, including said cover plate and collar, may be speedily applied to or removed from a fastened position on the vessel and when operatively applied to the vessel, the cover plate and the collar, in cooperation with the brim 16 and the peripheral wall 13 of the vessel bottom 12, are securely fastened against unintentional removal from the vessel by the continuously effective spring pressure exerted by the handle 20.

The portion of the cover plate 23 diametrically opposite the edge portion from which the handle 20 extends is provided with a notch defined by radially inwardly converging edge portions 26 and 27. This notch provides a space between the cover plate 23 and the pouring lip 17 of the vessel 10 through which a tea bag 28 or the like may be lowered into the vessel 10 and through which liquid may be introduced to and discharged from the interior of the vessel.

A slot 29 intersecting the cover plate 23 and a section of the upper end portion 18 of the handle 20 overlapping said cover plate 23 forms an inward extension of the notch defined by the converging edge portions 26 and 27 to provide a passageway in which a flexible string 30 attached to the tea bag 28 may be threaded and guided during lowering or raising movement of the tea bag relative to the liquid level within the vessel.

The handle 20 includes an upwardly facing section 31 which overhangs the upper rim of the vessel brim 16. An upwardly projecting rivet 32 or other suitable projection provides a cleat around which the portion of the string 30 located above the cover plate 23 may be wound and fastened in accordance with the selected adjusted position of the tea bag 28 within the vessel 10.

After liquid has been introduced into the vessel, such for example as to have a liquid level 33 as shown in the drawings, and the tea bag 28 has been allowed to complete infusion of the liquid to a desired strength which may be observed by the color of the liquid as it appears through the transparent walls of the vessel 10, the string 30 is pulled outwardly through the slot 29 and when the tea bag 28 is raised to occupy a position in the space between the liquid level 33 and the underside of the cover plate 23, the string 30 is made fast to the rivet 32 to keep the tea bag 28 in such raised position. The tea bag 28 is accordingly trapped against the underside of the cover plate 23 at the inner or rear end of the slot 29 at a distance sufficiently away from the pouring lip 17 so as to avoid any obstruction of the opening between said pouring lip 17 and the converging edge portions 26 and 27 of the cover plate 23.

The collar 21 is preferably of greater axial dimension than the height of the wall portion 13 of the vessel which is surrounded by the collar 21 so that when the upper edge of the collar 21 is seated against the downwardly facing shoulder 14, the lower edge of the collar 21 is engageable with a supporting surface to maintain the lower surface of the vessel bottom 12 in upwardly spaced relation to said supporting surface. As a result the collar 21 provides a base which will allow the article to be placed on tables or the like without marring the finish by transfer of heat from the bottom 12 of the vessel.

It will also be observed that shoulder 14 and the marginal wall 13 surrounded by said shoulder, are joined by an inwardly and downwardly sloping surface defining a fillet 34 which cooperates with the collar 21 to center the latter in uniformly outwardly spaced relation to the wall 13. Thus the collar 21 has engagement with the vessel only along the edge of the collar facing the shoulder 14, thereby minimizing the conduction of heat from the vessel to the collar 21 and accordingly adding further protection against damage by heat to a supporting surface on which the lower edge of the collar 21 may be rested when in use, without the necessity for using heat protective pads and the like.

The present embodiment of this invention is to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A liquid dispenser for use in preparing and serving a beverage by means of an infusion type package containing a material adapted to be infused in a body of liquid, said package having a flexible retrievable line attached thereto for raising and lowering said package in relation to said body of liquid, including a liquid holding vessel having a bottom portion, an upwardly open mouth-defining brim opposite said bottom portion, a side wall between said bottom portion and said brim, said bottom portion forming a reduced downward extension of the vessel to define a downwardly facing shoulder at the junction of said bottom portion and the side wall of the vessel, means for fastening the retrieving line of the package to a fixed support outside the vessel to hold the package in a selected raised position relative to said body of liquid contained in said vessel, including an attachment consisting of a cover member engaging the brim of the vessel along a portion of its periphery and of such contour at another portion of its periphery to provide an open space between the cover member and the brim of the vessel opposite thereto of sufficient size to admit the package therethrough when the cover member is in operative position relative to said brim, a collar encircling said bottom portion in spaced relation thereto except along a limited surface portion of said shoulder with which the upper edge of said collar has engagement, said collar having its lower edge in downwardly spaced relation to the lower limits of the bottom portion of the vessel when said cover member and collar are in operative position relative to said vessel and the area within said lower edge of the collar providing an unobstructed opening corresponding to the area within said upper edge of the collar, and a connecting handle member having said cover member fixed to one end thereof and said collar fixed to the other end thereof, said connecting handle member being made of elastic material and internally stressed to normally hold said cover member and collar at a distance apart less than the distance between said cover member and collar when in operative position relative to said vessel so as to yieldably hold said cover member and said collar against unintentional withdrawal from such operative position, and to allow said cover member and collar to be withdrawn from such operative position by springing the ends of the handle member farther apart.

2. In a liquid dispenser as defined in claim 1 wherein said cover member is provided with a relatively restricted slot forming an inner extension of said open space between the cover and the brim of the vessel opposite thereto in which slot the retrieving line has guided movement during raising and lowering movements of said package.

References Cited in the file of this patent

UNITED STATES PATENTS

| | | |
|---|---|---|
| D. 149,933 | Bushman | June 15, 1948 |
| 1,166,209 | Hoffman | Dec. 28, 1915 |
| 1,384,302 | Clarke-B. | July 12, 1921 |
| 2,004,883 | Wolcott | June 11, 1935 |
| 2,143,432 | Campbell | Jan. 10, 1939 |
| 2,193,366 | Hardwick | Mar. 12, 1940 |
| 2,284,087 | Ferguson | May 26, 1942 |
| 2,388,335 | McCullough | Nov. 6, 1945 |

FOREIGN PATENTS

| | | |
|---|---|---|
| 356,075 | Great Britain | Sept. 3, 1931 |